(12) United States Patent
Pan

(10) Patent No.: US 7,098,604 B2
(45) Date of Patent: Aug. 29, 2006

(54) SOLAR POWERED LAMP HAVING AN AUXILIARY STARTUP DEVICE

(76) Inventor: Yun Pan, 26A, Haidu Garden, Shatoujiao, Shenzhen (CN) 518000

( * ) Notice: Subject to any disclaimer, the term of this patent is extended or adjusted under 35 U.S.C. 154(b) by 185 days.

(21) Appl. No.: 10/849,093

(22) Filed: May 19, 2004

(65) Prior Publication Data
US 2005/0001564 A1    Jan. 6, 2005

(30) Foreign Application Priority Data
Jul. 2, 2003    (CN) ................................ 03 2 67219

(51) Int. Cl.
*H05B 41/16*    (2006.01)
(52) U.S. Cl. .................. 315/247; 315/209 R; 315/291; 315/226; 315/DIG. 5
(58) Field of Classification Search ................ 315/149, 315/159, 247, 291, 226, 219, 225, 224, 244, 315/209 R, 209 CD, DIG. 5, DIG. 7; 362/183, 362/186, 191, 202, 222, 223, 246
See application file for complete search history.

(56) References Cited
U.S. PATENT DOCUMENTS
5,155,668 A    10/1992   Tanner et al.

| | | | |
|---|---|---|---|
| 5,204,586 A * | 4/1993 | Moore | 315/159 |
| 5,235,254 A * | 8/1993 | Ho | 315/219 |
| 5,564,816 A * | 10/1996 | Arcadia et al. | 362/183 |
| 6,135,620 A * | 10/2000 | Marsh | 362/377 |
| 6,693,396 B1 * | 2/2004 | Hsu | 315/291 |
| 6,864,644 B1 * | 3/2005 | Kernahan | 315/307 |

* cited by examiner

*Primary Examiner*—Haissa Philogene
(74) *Attorney, Agent, or Firm*—Stephen C. Beuerle; Procopio Cory Hargreaves & Savitch LLP

(57) ABSTRACT

Disclosed is a solar powered lamp adopting a cold-cathode fluorescent lamp and an auxiliary startup device which can improve the efficiency of the voltaic-photo transformation when lighting the cold-cathode fluorescent lamp. The device comprises a direct current power unit, a DC/AC inverter circuit for generating a high voltage alternating current from the DC voltage to light a CCFL; and an auxiliary startup circuit disposed between the DC power supply unit and the DC/AC inverter circuit for generating across the input terminals of the DC/AC inverter circuit a voltage of about twice of the DC voltage output from the DC power supply unit.

14 Claims, 2 Drawing Sheets

SOLAR POWERED LAMP HAVING AN AUXILIARY STARTUP DEVICE

CROSS REFERENCE OF RELATED APPLICATIONS

The present application claims the benefit of Chinese application No. 03267219.5 filed on Jul. 2, 2003, entitled solar powered lamp, which is explicitly incorporated herein by reference in its entirety.

BACKGROUND OF THE INVENTION

1. Field of the Invention

This invention relates to a solar powered lamp, particularly to a solar powered lamp having a cold-cathode fluorescent bulb, and more particularly to a solar powered lamp with a cold-cathode fluorescent bulb and an auxiliary startup device.

2. Description of the Related Art

Solar powered lamp has been commonly used in place of the electrically powered lamp to illuminate pathways, yards, parks and other areas, for the purpose of saving existing fuel resources and protecting the environment from pollution.

U.S. Pat. No. 5,155,668 entitled "Solar Power Lamp Utilizing Cold Cathode Fluorescent Illuminating and Method of Facilitating Same" discloses a solar powered lamp, which utilizes photovoltaic devices to charge batteries which can activate a light source formed by the CCFL, in the absence of sunlight.

Conventionally, in a device for driving a cold-cathode fluorescent lamp (CCFL), as disclosed in the '668 patent, a direct-current voltage is needed to be converted into a high-tension alternating voltage by a "direct-current voltage/alternating voltage" inverter circuit (hereinafter referred to as a DC/AC inverter circuit). Then the resulting high-tension alternating voltage is supplied to the cold-cathode fluorescent lamp to light it.

In the cold-cathode fluorescent lamp, the value of the alternating voltage which is required to drive the lamp is about two or three times of the voltage which is required to light the lamp. Therefore, if the DC/AC inverter circuit converts, for example, a DC voltage of 4 volts directly to AC voltage of 1800 volts, and the CCFL operates at about 400 volts, the efficiency of the voltaic-photo transformation will be decreased significantly.

SUMMARY OF THE INVENTION

It is, therefore, an object of the present invention to provide a device for lighting a cold-cathode fluorescent lamp which can overcome the above-mentioned defects in the prior art.

According to the present invention, the cold-cathode fluorescent lamp lighting device comprises a direct current (DC) power unit, a DC/AC inverter circuit for generating a high voltage alternating current (AC) from the DC voltage to light a CCFL; and an auxiliary startup circuit disposed between the DC power supply unit and the DC/AC inverter circuit for generating across the input terminals of the DC/AC inverter circuit a voltage of about twice of the DC voltage output from the DC power supply unit.

In one embodiment of the invention, the auxiliary startup circuit comprises a first transistor and a second transistor each having a base, collector and emitter, the emitters are coupled together to one output terminal of the DC power supply unit, the bases are coupled to another output terminal of the DC power supply unit, the collector of the first transistor being coupled to the ground, and the collector of the second transistor being coupled to the DC/AC inverter circuit; and a capacitor coupled between the collector of the first transistor and the emitter of the second transistor.

Another object of the present invention is to provide a solar powered lamp utilizing the CCFL which can improve the efficiency of the transformer when turning on the CCFL lamp. The solar powered lamp of the present invention is powered by the photovoltaic cells (also referred to as a solar cell array) which charge an electrical storage device, such as a battery for providing power to the CCFL, in the absence of sunlight.

The solar powered lamp of the present invention comprises a photovoltaic cell receiving sunlight and generating electrical energy; an electrical storage device coupled to the photovoltaic cell for storing the electrical energy generated by the photovoltaic cell and providing low voltage DC; a DC/AC inverter circuit for generating a high voltage alternating current (AC) from the DC voltage to light a CCFL; and an auxiliary startup circuit disposed between the electrical storage device and the DC/AC inverter circuit for generating across the input terminals of the DC/AC inverter circuit a voltage of about twice of the DC voltage output from the electrical storage device.

Another object of the present invention is to provide a method for activating the CCFL which comprises a first step of generating across the input terminals of the DC/AC inverter circuit a voltage of about twice of the DC voltage output from a DC power supply device, a second step of generating a high AC voltage to startup the CCFL from the generated voltage, and a third step of providing the DC/AC inverter circuit with the DC output from the DC power supply device after the CCFL is started.

The nature, principle and utility of the invention will become more apparent from the following detailed description together with the accompanying drawings.

DETAILED DESCRIPTION OF THE PREFERRED EMBODIMENT

Figure 1:
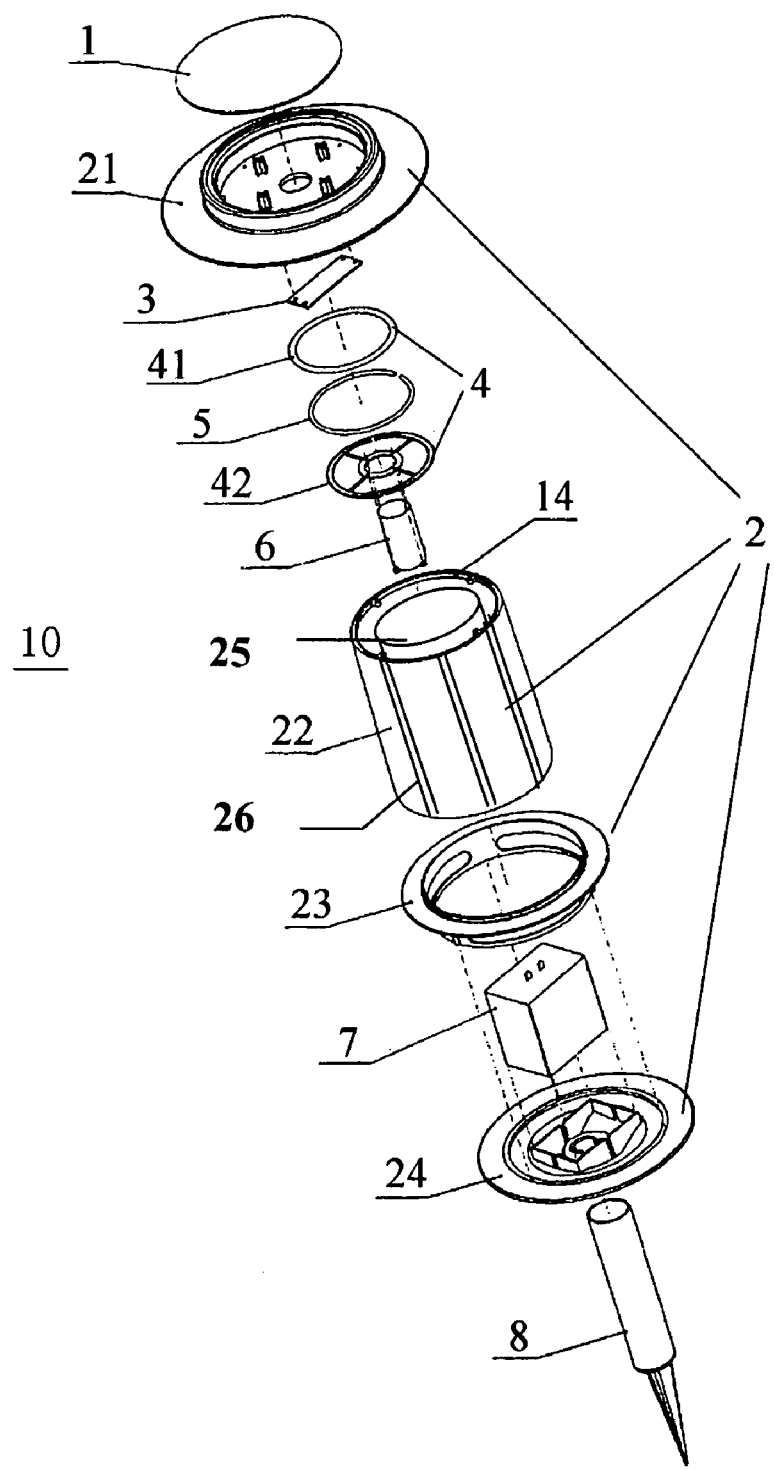
FIG. 1 is a perspective exploded view showing an exemplary solar powered lamp utilizing a CCFL lighting device according to the invention.

FIG. 1 is a perspective exploded view of an exemplary solar powered lamp 10 utilizing the CCFL lighting device in accordance with an embodiment of the present invention. The solar powered lamp may be positioned at any desired location for any desired application.

As shown in FIG. 1, a solar powered lamp 10 comprises a solar cell array plate 1 for converting solar power into electricity power, a CCFL 5 for illuminating, and a storage battery 7 for storing the electricity power from the solar cell plate 1 and powering the CCFL 5, and a circuit plate 3 for implementing power transmission, all of which are electrically connected with each other.

Specifically, a seat 2 composed of an upper cover 21, a translucent mask 22, a mid cover 23 and a lower cover 24 forms the main body of the solar powered lamp 10. A bracket 8 is fixed at the bottom of the main body for supporting the main body of the lamp 10. One end of the bracket 8 supports the main body and the other end of the same is preferably to be in the form of a sharp tip. In this way, the lamp 10 maybe easily inserted into the ground of any desired locations, for instance, into a garden, roadside, etc.

The translucent mask 22 is cylindraceous for accommodating an illumination device, e.g. a CCFL 5 and is fixed between the upper cover 21 and mid cover 23. The mid cover 23 is detachably attached to the lower cover 24. The solar cell array plate 1 is positioned at the top of the upper cover 21 in the form of exposure to sunlight.

The CCFL 5 is positioned within the translucent mask 22. A sleeve 4 comprising an upper lid 41 and a lower lid 42 is used for protecting the CCFL 5. A supporting pole 6 may be provided for supporting the CCFL at an appropriate position. Low efficacy of lighting and the short lamp life will be resulted when the CCFL works under the ambient condition of frostiness. According to a preferred embodiment of the invention, a translucent casing 25 can be provided between the CCFL 5 and the cylindraceous translucent mask 22. In this case, when the CCFL bulb is started, the temperature of the air inside the casing is heated by the irradiation of the bulb and the casing prevents the heat inside the casing from escaping outside, thereby protecting the bulb and improving the life of the CCFL.

Furthermore, a plurality of ribs 26 can be provided on the sidewall of the cylindraceous translucent mask 22 as shown in FIG. 1, or on the side wall of the casing 25 (not shown) to thereby diffuse the light and effect the soft sense of the light.

A storage battery 7 is placed inside an appropriate location of the main body of the lamp 10, for instance, between the mid cover 23 and lower cover 24. In the daytime, the solar cell array plate 1 is exposed to sunlight for converting the solar power into electricity power to charge the storage battery 7. When the sunlight is not sufficient, the storage battery 7 begins to discharge for powering the CCFL 5.

Figure 2:
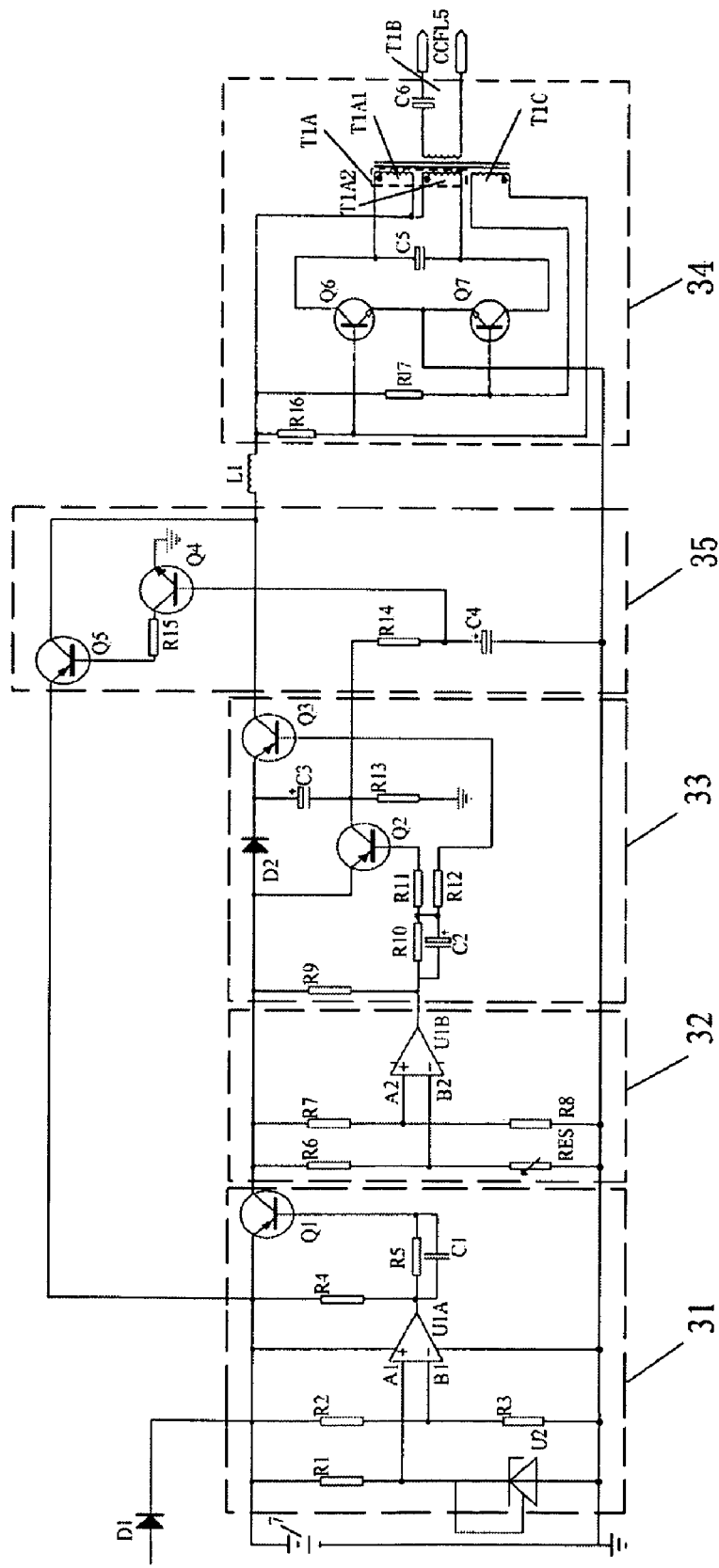
FIG. 2 is a schematic diagram of the circuitry of the CCFL lighting device according to the present invention.

FIG. 2 schematically shows a preferred embodiment of the circuit plate 3 used in the solar-powered lamp according to the invention, which comprises five blocks: a circuit 31 for protecting the battery from over-discharging, a circuit 32 for automatically switching on/off the lamp according to the ambient light condition, a circuit 33 for boosting the output from the battery 7 when starting the CCFL 5, a DC/AC inverter circuit 34 for generating an AC high voltage from the DC voltage to light the CCFL, and a main power supply circuit 35 for providing the current output from the battery 7 to the DC/AC inverter circuit 34, all of which will be described in detail in the following by ways of example for the purpose of illustration of the invention, and these illustrations are not intended to constitute any limitation to the invention.

The circuit 31 comprises an operational amplifier U1A configured as a comparator. The operational amplifier U1A can be a LM393, known to those skilled in the art. A resistor R1 is connected between the positive terminal of the battery 7 and a voltage stabilizer U2. The junction between the resistor R1 and the voltage stabilizer U2 is connected to the non-inverter input terminal A of the U1A to form a voltage reference source Vref coupled to the terminal A. The voltage stabilizer U2 can be formed by an IC circuit such as a TL431, known to those skilled in the art. The value of the voltage reference source Vref is selected depending on the type of the battery 7. For example, Vref can be 3.5–3.6 volts in case the rated voltage output from the battery 7 is 4 volts. The junction of the resistors R2 and R3 is connected to the inverter input terminal B of the operational amplifier U1A. Exemplary resistance values for resistors R1, R2 and R3 are 10K, 24K and 12K ohms, respectively.

The circuit 31 further comprises a switching circuit composed of a transistor Q1. A resistor R4 is coupled between the emitter of the transistor Q1 and the output of the operational amplifier U1A and operates as a pull-up resistor for the transistor Q1. A resistor R5 connected between the output of the operational amplifier U1A and the base of the transistor Q1 is a limiting resistor for preventing the transistor Q1 from being damaged by the overwhelming current through the base. A capacitor C1 in parallel with the resistor R5 is a speedup capacitor for temporarily increasing the current flowing through the transistor Q1 when turning on the transistor Q1. Exemplary resistance values for resistors R4 and R5 are 51K and 3 K ohms, respectively. The capacitor C1 has an exemplary capacitance value of 0.01 µF.

When the battery 7 is in a normal condition, i.e., the voltage output of the battery 7 is constant at its rated voltage level, the potential level at the terminal B1 produced by dividing the voltage output from the battery by resistors R2 and R3 is higher than that at the non-inverter terminal A1. The operational amplifier U1A outputs the low level to turn on the transistor Q1, a PNP bipolar transistor in this embodiment such as a 8550 known in the art, resulting in the current flowing through the CCFL bulb 5. On the other hand, when the output voltage of the battery 7 drops below the rated value due to the exhaust of the energy, the potential level at the non-inverter terminal A1 is higher than that at the inverter terminal B1, the operational amplifier U1A will output a high level to turn off the transistor Q1, thereby cutting off the current output from the battery 7 to prevent it from over-discharging.

Although the output voltage of the battery is used to indicate the condition of the battery in the above embodiment, it should be readily apparent to those skilled in the art that other electrical characteristics of the battery, such as a current, may also be used to provide an indication of the condition of the battery.

The circuit 32 comprises an operational amplifier U1B which is also configured as a comparator. The operational amplifier U1B in this embodiment is an LM393 known in the art. A resistor R6 is connected between the collector of the transistor Q1 and a photo-resistor RES. The junction of the resistor R6 and the photo-resistor RES is connected to the inverter terminal B2 of the operational amplifier U1B. The non-inverter terminal A2 of the operational amplifier U1B is connected with the junction of resistors R7 and R8. Exemplary resistance value for the resistor R6 is 51K ohms, and for R7 and R8 is 20K ohms.

The resistance value of the photo-resistor RES is lower, e.g. 2K ohms in the daylight and will be increased when the ambient light is not sufficient, e.g. 200K ohms in the evening. Therefore, when the potential at the inverter terminal B2 of the operational amplifier U1B is lower than that at the non-inverter terminal A2 in the daylight, the operational amplifier U1B outputs high level to turn off the PNP-type transistors Q2 and Q3, and hence the CCFL 5. When the ambient light weakens, the resistance value of the increases above a critical value, 51K ohms in this embodiment, the output of the operational amplifier U1B will be reversed to a low level to turn on the transistors Q2 and Q3, and hence the CCFL 5.

The circuit 33, also referred to as an auxiliary startup circuit, comprises transistors Q2 and Q3, both of which are PNP-type bipolar transistors in the embodiment and can be of 8550 type as known in the art. One end of resistor R9 is coupled the emitter of the transistor Q2 and the collector of the transistor Q1. Another end of resistor R9 is connected to the output of the operational amplifier U1B. A resistor R10 and a capacitor C2 both of which are connected in parallel are connected between the junction of R9 and the output of the operational amplifier U1B and the bases of the transistors Q2 and Q3 through resistors R11 and R12, respectively. The resistors R9, R10 have exemplary resistance values of 51K and 100K ohms, respectively. The resistors R11 and R12 have the same resistance value of 3.3K ohms. The capacitor C2 has an exemplary capacitance value of 47μF.

The resistor R9 functions as a pull-up resistor for both the transistors Q2 and Q3. The resistor R10 functions as the current-limiting resistor. The capacitor C2 operates as a speedup capacitor, which is similar to the capacitor C1. Since the output of the operational amplifier U1B drives two transistors Q2 and Q3 simultaneously, the resistance value of the resistor R10 is different from that of the resistor R5, and the capacitance value of the capacitor C2 is different from that of the capacitor C1, as will be readily understood by those skilled in the art.

A diode D2 is connected at its anode with the collector of the transistor Q1 and at its cathode with one end of a capacitor C3 connected between the collector of the transistor Q2 and the emitter of the transistor Q3. The Diode D2 provides a main current channel for charging the capacitor C3 and for keeping on the electrical power supply to a DC/AC inverter circuit 34 which will be described later after the capacitor C3 discharges completely. As is well known in the art, the mentioned DC/AC inverter circuit is employed to convert direct-current voltage output from the battery 7 into an alternating voltage to drive the CCFL 5.

In the illustrated embodiment, the capacitor C3 is an electrolytic capacitor of an exemplary capacitance value of 470μF, with its positive end connected to the cathode of the diode D2 and its negative end to the collector of the transistor Q2.

As previously discussed, the operational amplifier U1B outputs high level when the ambient light is sufficient. In this situation, both of the transistors Q2 and Q3 are turned off. The capacitor C3 is charged by the battery 7 through the diode D2 to Vcc, the voltage across the battery.

An exemplary DC/AC inverter circuit 34 will now be described in the following with reference to FIG. 2. As shown in FIG. 2, the DC/AC inverter circuit 34 comprises an inductor L1 with one end connected to the collector of the transistor Q3 and another end coupled to the bases of a pair of transistors Q6 and Q7 through resistors R16 and R17, respectively, to positively biases each of those transistors causing them to start conducting. Both the transistors Q1 and Q2 are NPN-type transistor in this embodiment.

A transformer T1 having a primary winding T1A, a secondary winding T1B and a tertiary or feedback winding 64 is electrically connected to transistors Q6 and Q7. Transistors Q6 and Q7 act as switches alternately connecting the low voltage of approximately 4 volts DC across the primary winding T1A.

The feedback winding T1C is arranged in such a way that the base of the conducting transistor is negative whereas the base of the non-conducting transistor is positive. The feedback winding T1C is electrically connected between the bases of transistors Q6 and Q7, as a result of which one of the transistors Q6 and Q7 conducts more than the other. If transistor Q6 is conducting, the feedback winding T1C electrically connected thereto more positively biases transistor Q6 with respect to transistor Q7, causing transistor Q6 to turn on fully and transistor Q7 to turn off. When transistor Q6 is conducting, current flows from the battery 7 through an inductor L1 to a center tap of the primary winding T1A, through an upper half T1A2 of the primary winding T1A. The current flows through the transistor Q6 from the collector to the emitter and returns to the negative terminal of the battery 7.

The flow of current along this path continues until the transformer T1 begins to saturate and the polarity of the feedback winding T1C between the bases of transistors Q6 and Q7 is reversed. Transistor Q6 is turned off and transistor Q7 starts conducting. When transistor Q7 is conducting, current flows from the battery 7 through an inductor L1 to the center tap of the primary winding T1A, through a lower half T1A2 of the primary winding T1A. The current flows through the transistor Q7 from the collector to the emitter and returns to the negative terminal of the battery 7, thus creating flow in the opposite direction through transistor Q7.

This switching continues in the manner described above to convert the low voltage of approximately 4 volts DC provided by the battery 7 to approximately 350 volts AC. A capacitor C5 connected in parallel with the primary winding T1A of the transformer T1 between the collectors of transistor Q6 and Q7 produces a parallel resonant LC circuit which helps control the frequency of oscillation.

The inductor L1 together with the transformer T1 creates a resonant inverter circuit which provides a sine wave output voltage. The inductor L1 builds charge when the current flows through at a given direction, and when flow reverses, discharges back through the transformer T1 to aid in generating a sine wave. The inductor L1, of conventional design, preferably has 90 turns. The transformer T1, also of a type known to those skilled in the art, has 18 turns in its primary winding T1A, 2 turns in its feedback winding T1C and 1450 turns in its secondary winding T1B. The saturation characteristic of the transformer T1 causes the switching to occur. A capacitor C6 electrically connected between the secondary winding T1B of the transformer T1 and the CCFL 5 is the series output capacitor.

The DC/AC inverter circuit 34 in the present invention can also be constituted in the manner as well known in the art.

Referring to FIG. 2, according to a preferred embodiment of the invention, a main power supply circuit 35 is provided in consideration of the fact that since the voltage drop on the transistors Q1 and Q3, and especially on the diode D2, which is about 0.3 to 0.7 volts, the voltage across the input terminals of the DC/AC inverter circuit 34 will be lower than the voltage provided by the battery 7. The main power supply circuit 35 comprises two transistors Q4 and Q5, a resister R15 connected between the base of Q5 and the collector of Q4. A delay circuit formed by a resistor R14 and a capacitor C4 is also provided as shown. The circuit 35 is set In the illustrated embodiment, the transistors Q4 is an NPN-type transistor of 8050 type known in the art, and the transistor Q5 is a PNP-type transistor of 8550 type. Exemplary resistance values for the resistor R14 and R15 are 47K and 3.3K ohms and exemplary capacitance value for the capacitor C4 is 1μF.

The operations of the circuits 33 and 35 will be described below.

As mentioned above, the transistors Q2 and Q3 are turned off due to the high output from the operational amplifier U1B when the ambient light is sufficient, and thus the transistors Q4 and Q5 are also turned off. With ambient light weakens gradually, the resistance value of the resistor RES increases to be greater than that of the resistor R6, the output of the operational amplifier U1B becomes low and thus turns on the transistors Q2 and Q3. The turning on of the transistors Q2 will then render the turning on of the transistors Q4 and Q5 after a delay caused by the delay circuit formed by the resistor R14 and the capacitor C4. After the transistor Q2 and Q3 are turned on, the diode D2 is turned off, and the capacitor C3 will discharge to the input terminals of the DC/AC inverter circuit 34 through the transistor Q3. In this case, the battery 7 is connected in series with the fully charged capacitor C3 to supply a DC voltage output Vout of about 2Vcc to the input terminals of the DC/AC inverter circuit 34. According to the experiment of the inventors, in case that the voltage Vcc is about 4 volts, a voltage Vout on the input terminals of the DC/AC inverter circuit 34 is about 7.7 volts.

After the transistors Q4 and Q5 are turned on after the delay, the battery 7 supplies the electrical power through the transistor Q5 to the DC/AC inverter circuit 34 to keep the CCFL 5 lighting.

Although the present invention has been described in connection with the preferred embodiments thereof, it will be obvious to those skilled in the art that various changes and modifications may be made. Therefore, the appended claims are intended to cover all such changes and modifications as fall within the true spirit and scope of the invention.

The invention claimed is:

1. A device for lighting a cold-cathode fluorescent lamp comprising:
    a direct current power supply unit for providing a low voltage direct current;
    an auxiliary startup circuit connected to the direct current power unit; and
    a DC/AC inverter circuit connected to the auxiliary startup circuit, which generates a higher voltage alternating current from the output of the auxiliary startup circuit to light the cold-cathode fluorescent lamp,
    wherein the auxiliary startup circuit generates across the input terminals of the DC/AC inverter circuit a voltage as about twice as the direct current voltage output from the direct current power supply unit,
    wherein the auxiliary startup circuit comprises:
    a first transistor and a second transistor, each having a base, a collector and an emitter, wherein the two emitters are coupled together to one output terminal of the direct circuit power supply unit, the two bases are coupled to another output terminal of the direct circuit power supply unit, the collector of the first transistor is coupled to the ground, and the collector of the second transistor is coupled to the DC/AC inverter circuit; and
    a first capacitor coupled between the collector of the first transistor and the emitter of the second transistor.

2. The device according to claim 1, further comprising a main power supply circuit including a fourth transistor and a fifth transistor, wherein the collector of the fourth transistor is connected with the base of the fifth transistor, the base of the fourth transistor is connected with the first capacitor, the emitter of the fourth transistor is grounded, the emitter of the fifth transistor is coupled to the direct current power supply unit, and the collector of the fifth transistor is connected to the input of the DC/AC inverter circuit.

3. The device according to claim 1, further comprising a protecting circuit provided between the direct current power supply unit and the auxiliary startup circuit for protecting the direct current power supply unit from being over-discharged, said protecting circuit comprising:
    a first comparator circuit including
    a first operational amplifier,
    a first resistor connected with one end to the direct current power supply unit and with another end to a voltage stabilizer, and
    a second resistor connected with one end to the direct current power supply unit and with another end to a third resistor and the inverter input terminal of the first operational amplifier; and
    a switch circuit comprising a third transistor, of which the base is connected to the output of the first operational amplifier, and the emitter is connected to the direct current power supply unit.

4. The device according to claim 3, further comprising a fourth resistor connected between the output terminal of the operational amplifier and the emitter of the third transistor, and a fifth resistor and a second capacitor connected in parallel between the output terminal of the first operational amplifier and the base of the third transistor.

5. The device according to claim 3, further comprising a second comparator circuit provided between the output of the switch circuit and the DC/AC inverter circuit, including
    a second operational amplifier;
    a sixth resistor connected between the inverter terminal of the second operational amplifier and the collector of the first transistor;
    a photo-resistor connected to the inverter terminal of the second operational amplifier; and
    a seventh resistor connected between the non-inverter terminal of the second operational amplifier and the collector of the first transistor; and
    an eighth resistor connected to the non-inverter terminal of the second operational amplifier.

6. A solar powered lamp having a cold-cathode fluorescent lamp comprising:
    a photovoltaic cell receiving sunlight and generating electrical energy;
    an electrical storage device coupled to said photovoltaic cell, storing the electrical energy generated by said photovoltaic cell and providing a low voltage direct current;
    an inverter circuit for generating a higher voltage alternating current from the low DC voltage to light the cold-cathode fluorescent lamp; and
    an auxiliary startup circuit connected between the electrical storage device and the inverter circuit for generating across the input terminals of the DC/AC inverter circuit a voltage as about twice as the DC voltage output from the electrical storage device,
    wherein the auxiliary startup circuit comprises:
    a first transistor and a second transistor, each having a base, a collector and an emitter, wherein the two emitters are coupled together to one output terminal of the direct circuit power supply unit, the two bases are coupled to another output terminal of the direct circuit power supply unit, the collector of the first transistor is coupled to the ground, and the collector of the second transistor is coupled to the DC/AC inverter circuit; and
    a first capacitor coupled between the collector of the first transistor and the emitter of the second transistor.

7. The solar powered lamp according to claim 6, further comprising a main power supply circuit including a fourth transistor and a fifth transistor, wherein the collector of the fourth transistor is connected with the base of the fifth transistor, the base of the fourth transistor is connected with the first capacitor, the emitter of the fourth transistor is grounded, the emitter of the fifth transistor is coupled to the direct current power supply unit, and the collector of the fifth transistor is connected to the input of the inverter circuit.

8. The solar powered lamp according to claim 6, further comprising a casing provided between the CCFL and a translucent mask.

9. The solar powered lamp according to claim 8, further comprising a plurality of ribs provided at the outer side of the casing or of the translucent mask.

10. The solar powered lamp according to claim 6, further comprising a protecting circuit provided between the direct current power supply unit and the auxiliary startup circuit for protecting the direct current power supply unit from being over-discharged, said protecting circuit comprising:
   a first comparator circuit including
      a first operational amplifier,
      a first resistor connected with one end to the direct current power supply unit and with another end to a voltage stabilizer, and
      a second resistor connected with one end to the direct current power supply unit and with another end to a third resistor and the inverter input terminal of the first operational amplifier; and
   a switch circuit comprising a third transistor, of which the base is connected to the output of the first operational amplifier, and the emitter is connected to the direct current power supply unit.

11. The solar powered lamp according to claim 10, further comprising a second comparator circuit provided between the output of the switch circuit and the inverter circuit, including
   a second operational amplifier;
   a sixth resistor connected between the inverter terminal of the second operational amplifier and the collector of the first transistor;
   a photo-resistor connected to the inverter terminal of the second operational amplifier;
   a seventh resistor connected between the non-inverter terminal of the second operational amplifier and the collector of the first transistor; and
   an eighth resistor connected to the non-inverter terminal of the second operational amplifier.

12. The solar powered lamp according to claim 10, further comprising a fourth resistor connected between the output terminal of the first operational amplifier and the emitter of the third transistor, and a fifth resistor and a first capacitor connected in parallel between the output terminal of the first operational amplifier and the base of the third transistor.

13. A method for lighting a cold-cathode fluorescent lamp, comprising the steps of:
   generating across the input terminals of a DC/AC inverter circuit a voltage as about twice as a DC voltage output from a DC power supply device utilizing an auxiliary startup circuit;
   converting the generated voltage to a higher AC voltage to activate the cold-cathode fluorescent lamp;
   firstly determining whether the voltage output from the DC power supply device is lower than an predetermined value;
   switching off the output from the DC power supply device, where the voltage output from the DC power supply device is lower than the predetermined value; and
   switching on the output from the DC power supply device, where the voltage output from the DC power supply device is equal to or higher than the predetermined value.

14. The method according to claim 13, further comprising:
   providing the DC/AC inverter circuit with the DC output from the DC power supply device after the cold-cathode fluorescent lamp is activated.

* * * * *